Nov. 10, 1964 N. CELESTINI 3,156,779
LINE FINDING ARRANGEMENT
Filed Nov. 25, 1960
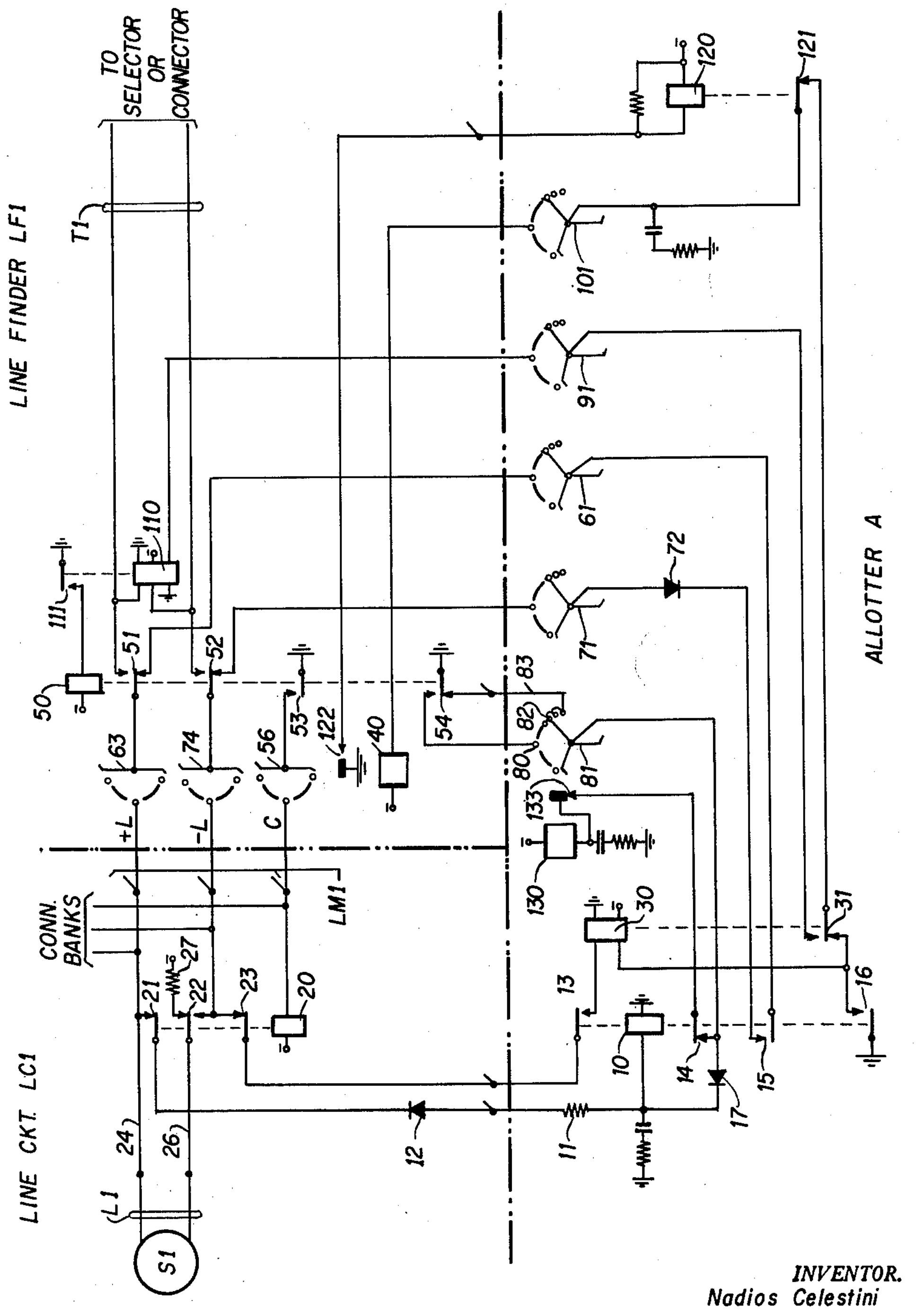
INVENTOR.
Nadios Celestini
BY C. A. Gulbrandsen
Atty.

3,156,779
LINE FINDING ARRANGEMENT

Nadios Celestini, Milan, Italy, assignor to Automatic Electric Laboratories, Inc., Northlake, Ill., a corporation of Delaware Filed Nov. 25, 1960, Ser. No. 71,703
9 Claims. (Cl. 179—18)

This invention relates to a line finding arrangement, and more particularly to such an arrangement used with a line circuit of the type in which a service request from a calling line is detected by a shift of potential, and in which stepping type switches are used in the line finder and allotter equipment. Its principal object is to provide a satisfactory and reliable arrangement in which a minimum of equipment is used in the line circuits, line finders, and allotter.

The line circuit is of the type having one wire of the two-wire subscriber line connected through resistance to a source of potential usually the negative pole of the exchange battery, and the other wire is connected through an isolating impedance to a common call detector. A subscriber initiating a call from any one of the lines closes a circuit between the two wires of his line, producing a shift of potential at the input of the common detector. In response to this change of potential the detector operates and initiates a line finder operation to find the calling line. Each line is associated with a line multiple having connections to bank contacts of each finder and connector switch.

According to the invention, the line finder switch is arranged to search for the calling line potential on the bank contacts of the talking pair of the line multiple, all lines which have not been seized by a finder or a connector having one wire of the subscriber line disconnected from the corresponding line multiple, the subscriber side being connected through the resistance means to a source of potential, which may be the negative pole of the exchange battery, and the line multiple side being connected to a common test device; and the other side of the subscriber line being connected to the corresponding line multiple and bank contacts, and the two wipers in the talking path of the allotted line finder being coupled together. In response to the initiation of a call the source of potential connected to the one line conductor is coupled through the subscriber's set to the other conductor and thence through the individual isolating impedance to the common detector, which responds to start the allotted line finder switch. The line finder steps until it reaches the bank contacts of the calling line, whereupon a circuit is completed from the source of potential over the subscriber line and through his subset thence through the line finder switch and the circuit interconnecting the two wipers of the talking conductors back to the line multiple and to the common test device which operates and stops the line finder.

In a preferred embodiment of the invention, the circuit interconnecting the two wipers of the line finder switch includes a diode which is forward biased in the described test circuit, but which is reverse biased for the potential appearing across any busy lines, thereby preventing clicks on such lines as the line finder steps across their bank contacts.

Another feature of the invention relates to a guard circuit using one wiper and set of bank contacts of the stepping switch of the allotter. Each line finder which is busy applies a marking potential to its individual contacts of this bank which causes the allotter switch to step whenever the wiper is on that bank contact. When the allotted line finder seizes a calling line, the guard marking potential applied to this bank contact causes the common detecting device to be released even if another line is requesting service until the allotter seizes another idle finder. Further according to the invention, one or more of this set of bank contacts is connected in common to all of the line finders, and any line finder which is idle places the marking potential thereto, and if all line finders are busy no marking potential appears on these latter contacts so that the allotter switch stops in the corresponding position, until at least one finder becomes idle, thereby marking these contacts and causing the allotter to step and seize the idle finder.

The above-mentioned and other objects and features of this invention and the manner of obtaining them will become more apparent and the invention itself will be best understood by reference to the following description of an embodiment of the invention taken in conjunction with the single figure of the drawing wherein a line finder, a line circuit, and an allotter are shown.

The drawing shows one of the line circuits LC1, one of the line finders LF1, and the allotter A of a small exchange, such as a PABX. The three conductors +L, —L, and C of the line multiple LM1 are connected to bank contacts associated with the wipers 63, 74, and 56 of the line finder LF1, to corresponding bank contacts of the other line finders, and to the connector banks. The line circuit includes a cutoff relay 20, but no individual line relay. The relay 10 of the allotter A functions as a common line relay for all of the line circuits, and also as a common start relay for all of the line finders. The +L conductor is permanently connected to the wire 24 of line L1 and the conductor C is permanently connected through the winding of the cutoff relay 20 to negative battery. The —L conductor may be connected through contacts 22 to the wire 26 of the line L1. In the idle condition, the wire 26 is connected through break contacts 22 and a resistor 27 to negative battery. Wire 24 is connected through break contacts 21 and a diode 12, and thence through a common resistor 11 and the winding of relay 10 to ground.

The line finder LF1 includes only a rotary line finder switch, a line relay 110, and a hold relay 50. The allotter A includes a rotary distributor switch, the common line and start relay 10, a relay 30 which functions as a common line testing relay and as a stopping relay for the line finders, and an interrupter relay 120 common to the line finders.

With the line circuit LC1 in the idle condittion, the subscriber line L1 has its conductor 26 connected through break contacts 22 and resistor 27 to negative battery, and its conductor 24 connected through break contacts 21, diode 12 and resistor 11 and the winding of relay 10 to ground. Upon the initiation of a call by closure of the switch hook contacts at the station S1, relay 10 operates, at its contacts 13 completes a connection of the upper winding of relay 30 from ground to the —L conductor of line multiple LM1, and at its contacts 16 completes a circuit for starting the rotary switch of the preallotted line finder LF1. A circuit is also completed from contacts 16 through the lower winding of relay 30 to negative battery, thus pre-energizing but not operating this relay.

Note that if one or both wires of line L1 are grounded that the common line relay 10 does not respond, and because of the isolation provided by diode 12 the functioning of the other lines is unaffected.

To step the line finder switch a circuit extends from negative battery through the winding of motor magnet 40, bank contacts and wiper 101 of the allotter switch, contacts 121, contacts 31, and contacts 16 to ground. The interrupter contacts 122 close to operate the interrupter relay 120, thereby opening contacts 121 to de-energize the motor magnet. This cycle repeats to cause the wipers of the line finder to step until they encounter the bank contacts of the calling line which is requesting service. The test relay 30 operates over the circuit from negative battery through resistor 27, contacts 22, the two conductors of line L1, bank contacts of wiper 63 of the line finder switch, contacts 51, bank contacts on wiper 61 of the allotter switch, contacts 15, a diode 72, wiper 71 and bank contacts of the allotter switch, contacts 52, wiper 74 and bank contacts of the finder switch, contacts 23, and contacts 13 through the upper winding of the test relay 30 to ground. Relay 30 operates and at its contacts 31 opens the stepping circuit for the line finder switch and completes a circuit path through wiper 91 and bank contacts of the allotter switch through the lower winding of relay 110 in the line finder to ground. Relay 110 operates and at its contacts 111 extends ground to relay 50. Relay 50 operates, and at its contacts 51 and 52 switches through the connection from the +L and —L conductors of the line multiple and the wipers 63 and 74 of the finder switch to the trunk T1 extending to a selector or connector; and at contacts 53 ground is extended through the wiper and bank contacts 56 to the winding of the cutoff relay 20 in the line circuit. The cutoff relay at its contacts 21 and 23 disconnects the subscriber line conductors from the common line relay 10 and the test relay 30; and at its contacts 22 completes a connection from wire 26 of the subscriber line L1 to the —L conductor of the line multiple LM1.

During the stepping of the line finder switch, the test relay 30 cannot operate on idle lines, which have no negative battery on the +L wire, and on busy lines, which have the cutoff relay 20 operated.

The finder switch in stepping across busy lines shunts them temporarily, but the diode 72 prevents any click from occuring. The diode 72 must have a high reverse resistance if no click is to occur on busy lines. One suitable choice is a silicon diode manufactured by Hughes, No. HR 1423, which has an inverse resistance of two megohms, an inverse voltage peak of 200 volts, and a forward current peak of 1.5 amperes.

Since the subscriber lines may have some leakage, for good performance relays 110 and 30 should be more sensitive than relay 10.

In response to switch-through upon seizure of the calling line, relay 50 of the line finder at its make contacts 54 places ground on the bank contact 80 of the allotter switch and to the wiper 81 which is resting thereon. This ground is extended through diode 17 to short circuit the winding of relay 10. Therefore the relay 10 releases even if a call is being initiated from another line. The ground from wiper 81 is also extended through break contacts 14 of relay 10 and interrupter contacts 133 and the winding of motor magnet 130 to battery, causing the allotter switch to step.

Since wiper 81 finds a ground potential on the bank contact of each busy line finder, the allotter switch continues to step until wiper 81 stops on the bank contact of an idle line finder. All bank contacts associated with wiper 81 which are not used for connection to one of the line finders, such as contact 82, are jumpered together and connected over wire 83 in multiple to the break contacts 54 of the line finders. Therefore if any one of the line finders is idle, ground will appear on wire 83 and bank contacts such as 82 connected thereto, causing the allotter switch to step past these contacts and to find an idle finder. However if all the finders are busy, ground on contact 82 will cause the allotter switch to stop thereon until one of the finders becomes idle.

While I have described above the principles of my invention in connection with specific apparatus, it is to be clearly understood that this description is made only by way of example and not as a limitation to the scope of my invention.

What is claimed is:

1. In a telephone system, a switchboard, a group of lines each having a pair of conductors, a plurality of line circuits in said switchboard each terminating one of said lines, a line finder including a finder switch having a pair of line wipers and a pair of contact banks, the first line-conductor of each said pair being normally connected to the first contact of the corresponding pair of finder-bank contacts, and the second line-conductor of each said pair being normally connected to a source of potential in said line circuit, a testing device common to all said lines, means operated responsive to the closure of the line loop upon the initiation of a call on one of said lines, to start said finder switch, connect said testing device to the second contact of the aforementioned corresponding pair of finder-bank contacts, and cause a bridge path to be closed across said pair of finder wipers, and said testing device being operated, in a circuit extending from said potential over said loop, said first finder-bank contact and wiper, said bridge, and said second finder-wiper and contact, in response to said wipers engaging the line-bank contacts of said calling line, for stopping said finder switch.

2. In a telephone system, the combination as claimed in claim 1, in which said means comprises a call detection device common to all said lines and connected to said first line-conductor of each pair.

3. In a telephone system, the combination as claimed in claim 2, wherein said line finder switch further includes a third wiper and contact bank, each of said line circuits having a cut-off relay and a control conductor extending from an individual contact of said third contact-bank to said cut-off relay, means operating said cut-off relay upon said third wiper stepping to the said third-bank contact of the calling line circuit to thereby disconnect said source of potential from said second line conductor, said common call detection device from said first line conductor, and said common testing device from said second finder-bank contact.

4. In a telephone system, the combination as claimed in claim 3, wherein said cut-off relay further includes contacts for completing a circuit from said second line-conductor to its individual bank-contact of said second finder-switch bank.

5. In a telephone system, the combination as claimed in claim 1, wherein there is provided a plurality of said line finders, said combination further including a diode in said bridge path closed across said first and second finder-wipers while they are being stepped to test for said calling line, said diode being poled to be forward-biased with respect to said normal potential but reversed-biased with respect to the polarities existing on the line bank contacts of busy lines.

6. In a telephone system, the combination as claimed in claim 2, wherein there is provided an allotter apparatus common to said plurality of line finders, said allotter apparatus including said call detection device and said testing device.

7. In a telephone system, the combination as claimed in claim 6, further including circuit means responsive to the operation of said testing device for shunting said common call-detection device to cause it to release whether or not another said line is initiating a call, and for causing another said line finder to be allotted and thereby remove said shunt from the said call detection device.

8. In a telephone system, the combination as claimed in claim 7, wherein the said means for shunting said common call detection device includes an allotter switch in said allotter apparatus, said allotter switch comprising at least one wiper and associated bank of contacts, each said line finder having a connection to an individual one of the contacts of said allotter bank, and additional contacts of said allotter bank having a connection in multiple to all of said line finders, a busy marking potential in each of said finders normally placed on said multiple connection, the aforementioned circuit means in each said finder being controlled by said common testing device for switching said marking potential from said multiple connection to the corresponding said individual connection, and means responsive to said busy markings potential encountered by said allotter wiper when positioned in one of said individual connections to cause the allotter switch to step to connect to an idle one of said line finders if one is available, and to stop on said additional contacts of said allotter bank if all line finders are busy until one becomes idle.

9. In a telephone system, the combination as claimed in claim 8, wherein the said call detection device in said allotter apparatus is a common line relay, and wherein said allotter apparatus includes a diode connecting said allotter wiper to the winding of said line relay, said line relay being shunted by way of said diode, thereby said line relay is caused to release in response to the allotted line finder finding said calling line.

References Cited in the file of this patent

UNITED STATES PATENTS

| | | |
|---|---|---|
| 1,723,524 | Rosa | Aug. 6, 1929 |
| 2,595,232 | Dimond | May 6, 1932 |
| 2,657,270 | Buchner | Oct. 27, 1953 |
| 2,835,740 | Heetman | May 20, 1958 |
| 2,844,654 | Hemel | July 22, 1958 |